US011822527B2

(12) United States Patent
H S et al.

(10) Patent No.: US 11,822,527 B2
(45) Date of Patent: *Nov. 21, 2023

(54) MASTER DATA INCONSISTENCY EVALUATOR (MICE)

(71) Applicant: SAP SE, Walldorf (DE)

(72) Inventors: Shwetha H S, Bangalore (IN); Arindam Bhar, Bangalore (IN); Arun Kumar Gowd, Bangalore (IN); Anand K, Palayamkotai (IN); Ranjith PR, Bangalore (IN); Jothivenkatesh M, Kumbakonam (IN); Nabhish Saxena, Bangalore (IN); Bidisha Tripathi, Bangalore (IN); Sudarshan Milind Gokhale, Bangalore (IN); Muskan Gupta, Chaziabad (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,787

(22) Filed: Nov. 29, 2022

(65) Prior Publication Data

US 2023/0085753 A1 Mar. 23, 2023

Related U.S. Application Data

(63) Continuation of application No. 17/163,184, filed on Jan. 29, 2021, now Pat. No. 11,561,945.

(51) Int. Cl.
*G06F 16/00* (2019.01)
*G06F 16/215* (2019.01)
*G06F 16/23* (2019.01)
*G06F 11/14* (2006.01)
(Continued)

(52) U.S. Cl.
CPC ........ *G06F 16/215* (2019.01); *G06F 11/1471* (2013.01); *G06F 16/22* (2019.01);
(Continued)

(58) Field of Classification Search
CPC ............ G06F 11/1446; G06F 11/1451; G06F 16/11; G06F 16/113; G06F 16/13;
(Continued)

(56) References Cited

U.S. PATENT DOCUMENTS 9,298,729 B2   3/2016  Hazlewood et al.
10,621,492 B2  4/2020  Oberhofer et al.
(Continued)

OTHER PUBLICATIONS

"U.S. Appl. No. 17/163,184, Examiner Interview Summary dated Aug. 29, 2022", 2 pgs.
(Continued)

*Primary Examiner* — Shyue Jiunn Hwa
(74) *Attorney, Agent, or Firm* — SCHWEGMAN LUNDBERG & WOESSNER, P.A.

(57) ABSTRACT

Systems, methods, and computer products are described herein for identifying data inconsistencies within database tables associated with an application. A master data inconsistency evaluator receives data including at least one selection parameter within at least one database table. By the master data inconsistency evaluator evaluates the at least one selection parameter by comparing the at least one selection parameter with other database tables associated with the application to identify data inconsistencies. The master data inconsistency evaluator repairs the data inconsistencies to further facilitate an error free transaction.

20 Claims, 12 Drawing Sheets

(51) Int. Cl.
*G06F 16/2453* (2019.01)
*G06F 16/22* (2019.01)

(52) U.S. Cl.
CPC .... *G06F 16/2365* (2019.01); *G06F 16/24532* (2019.01); *G06F 2201/80* (2013.01); *G06F 2201/87* (2013.01)

(58) Field of Classification Search
CPC ...... G06F 16/178; G06F 16/21; G06F 16/215; G06F 16/221; G06F 16/2358; G06F 16/2365; G06F 16/24565; G06F 16/254; G06F 16/27; G06F 16/275; G06F 16/28; G06F 16/283; G06F 21/577; G06F 21/604; G06F 3/061; G06F 3/064; G06F 3/067; G06F 2209/509; G06F 9/5027; G06F 40/30; G06F 9/4825; G06F 9/4881; G06F 9/547; G06N 10/00; G06N 20/00; G06N 20/10; G06N 3/044; G06N 3/045; G06N 3/063; G06N 3/084; G06N 5/01; G06Q 10/047; G06Q 50/30
See application file for complete search history.

(56) References Cited

U.S. PATENT DOCUMENTS

| | | | |
|---|---|---|---|
| 2007/0180490 A1 | 8/2007 | Renzi et al. | |
| 2014/0058789 A1 | 2/2014 | Doehring et al. | |
| 2014/0122411 A1 | 5/2014 | Teichmann et al. | |
| 2018/0183860 A1* | 6/2018 | Majumdar | H04L 67/1001 |
| 2020/0089792 A1* | 3/2020 | Packirisamy | G06F 16/2365 |
| 2020/0153900 A1* | 5/2020 | Lebresne | G06F 3/067 |
| 2022/0245102 A1 | 8/2022 | H S et al. | |

OTHER PUBLICATIONS

"U.S. Appl. No. 17/163,184, Non Final Office Action dated Jun. 21, 2022", 12 pgs.

"U.S. Appl. No. 17/163,184, Notice of Allowance dated Nov. 17, 2022", 14 pgs.

"U.S. Appl. No. 17/163,184, Response filed Sep. 15, 2022 to Non Final Office Action dated Jun. 21, 2022", 13 pgs.

Butler, et al., "Master Data Management, An Oracle White Paper", Oracle Corporation, (Jun. 2010), 61 pgs.

Haneem, et al., "Resolving data duplication, inaccuracy and inconsistency issues using master data management", IEEE, (2017), 6 pgs.

Hanif, et al., "Analysis and design of data synchronization algorithm for master data management tools based on open source platform at PT.XYX", 2019 International Conference on Electrical Engineering and Informatics (ICEEI), Bandung, Indonesia, (Jul. 9-10, 2019), 244-249.

Pramod, "Business partner CVI - master data consistency checks supporting the SAP S/4HANA Move", (Jul. 22, 2019), 7 pgs.

* cited by examiner

US 11,822,527 B2

MASTER DATA INCONSISTENCY EVALUATOR (MICE)

CROSS-REFERENCE TO RELATED APPLICATIONS

This application is a continuation of prior application Ser. No. 17/163,184, filed on Jan. 29, 2021, which is incorporated by reference herein in its entirety.

TECHNICAL FIELD

The subject matter described herein relates to identifying and remedying data inconsistencies between database tables.

BACKGROUND

Master data plays a role in any business. Consistency of master data such as information about customers, suppliers and employees can play a role in success of any organization. Organizations, however, can be confronted with issues around the quality of their master data with scenarios such as duplicity of records, inconsistent and/or invalid data being common occurrence especially in large businesses operating globally. There could be many reasons for such inconsistent data—historic data from legacy systems, business demands to maintain minimum data to continue serving the customers, historical defects, limited validations at data entry—to name a few. Data inconsistency across the master data model pose challenges with respect to efficient operations. These master data inconsistencies can halt processing of transactions. Also, some of the master data inconsistencies may not even be identified in transactional processing but that does not mean businesses can ignore such issues as they ultimately influence business decisions—for e.g., indirectly through incorrect business analytics. For those cases, where the issues are identified in operations, it may not be possible to accurately identify the source of the problem and therefore the solutions are also temporary stop-gap arrangements to continue with the business processes. These stop-gap arrangements—for e.g., direct database table operations to correct the issue at hand could even be detrimental to sanctity of the data eventually leading to further issues in applications consuming this master data.

SUMMARY

In one aspect, a method for identifying data inconsistencies within database tables associated with an application includes receiving, by a master data inconsistency evaluator, data includes at least one selection parameter within at least one database table. The master data inconsistency evaluator evaluates the at least one selection parameter by comparing the at least one selection parameter with other database tables associated with the application to identify data inconsistencies. The master data inconsistency evaluator repairs the data inconsistencies to further facilitate an error free transaction.

In some variations, the data further includes control parameters including at least one of (i) a block size, (ii) a queue name, (iii) a server group, or (iv) a maximum processes.

In other variations, the block size defines a number of records for processing in each data package associated with the evaluating.

In some variations, the queue name defines a name of a background process in which data packages associated with the evaluating.

In other variations, the server group is used for parallel processing of a background evaluation mode.

In some variations, the maximum processes define a number of data blocks processed in parallel during the evaluating.

In other variations, the database tables are stored within an in-memory database.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the subject matter described herein can identify and/or remedy the inconsistencies across the data models of the business objects. The subject matter described herein provides an inconsistency evaluation as a framework. MICE provides interfaces which depend on event-based processing for applications to have a consistent approach to finding inconsistencies across application objects. MICE is a data model driven inconsistency evaluator. Each application is provided flexibility to perform data checks as appropriate for their context including a check on impacted tables in the data model. MICE offers simplistic steps for applications to configure their checks. Inconsistencies found in any run are persisted in the system for later consumption—either for correction of the inconsistent data or for analytics. Lastly, the MICE tool can be used by customers/partners to evaluate and repair inconsistencies within their data models. This can be achieved by registering their applications using implementing the interface provided by MICE tool.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The Master Data In-Consistency Evaluator (MICE) tool provides a framework to register, identify, and/or correct the inconsistencies within the application business object data models.

Figure 1:
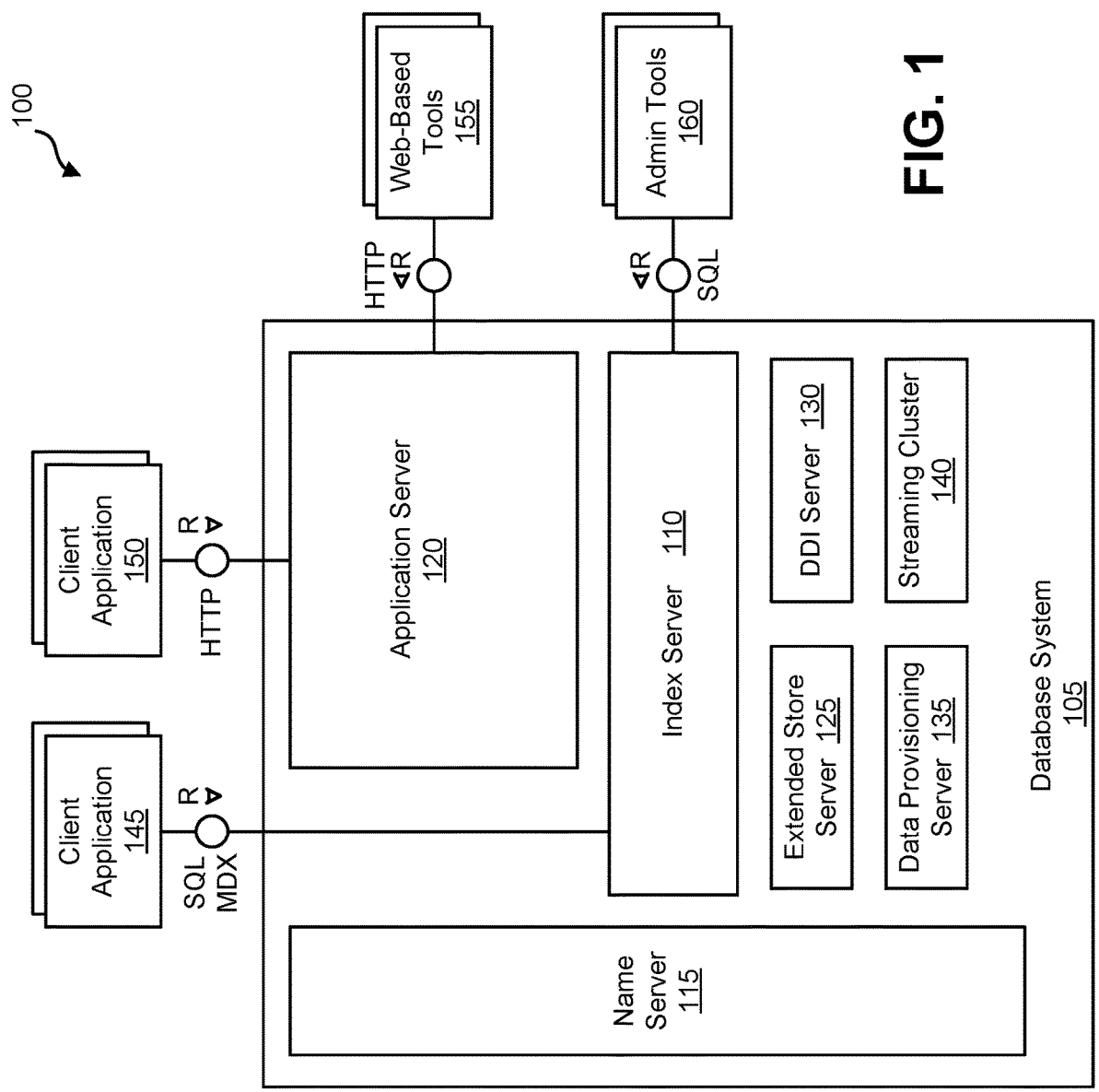
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input/output (I/O) and in which disk storage is required to make any changes durable. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter software development kit (SDK) for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
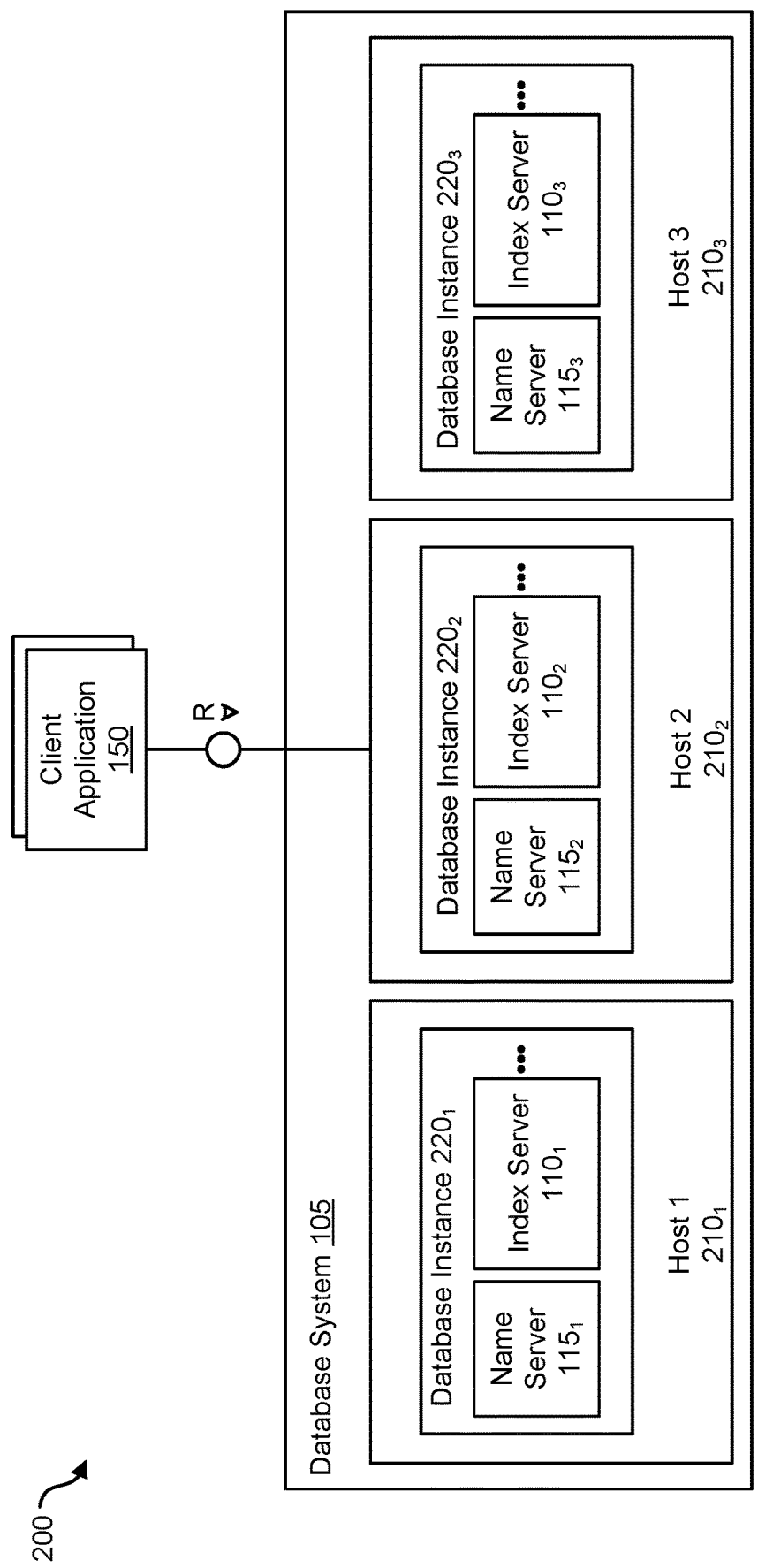
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
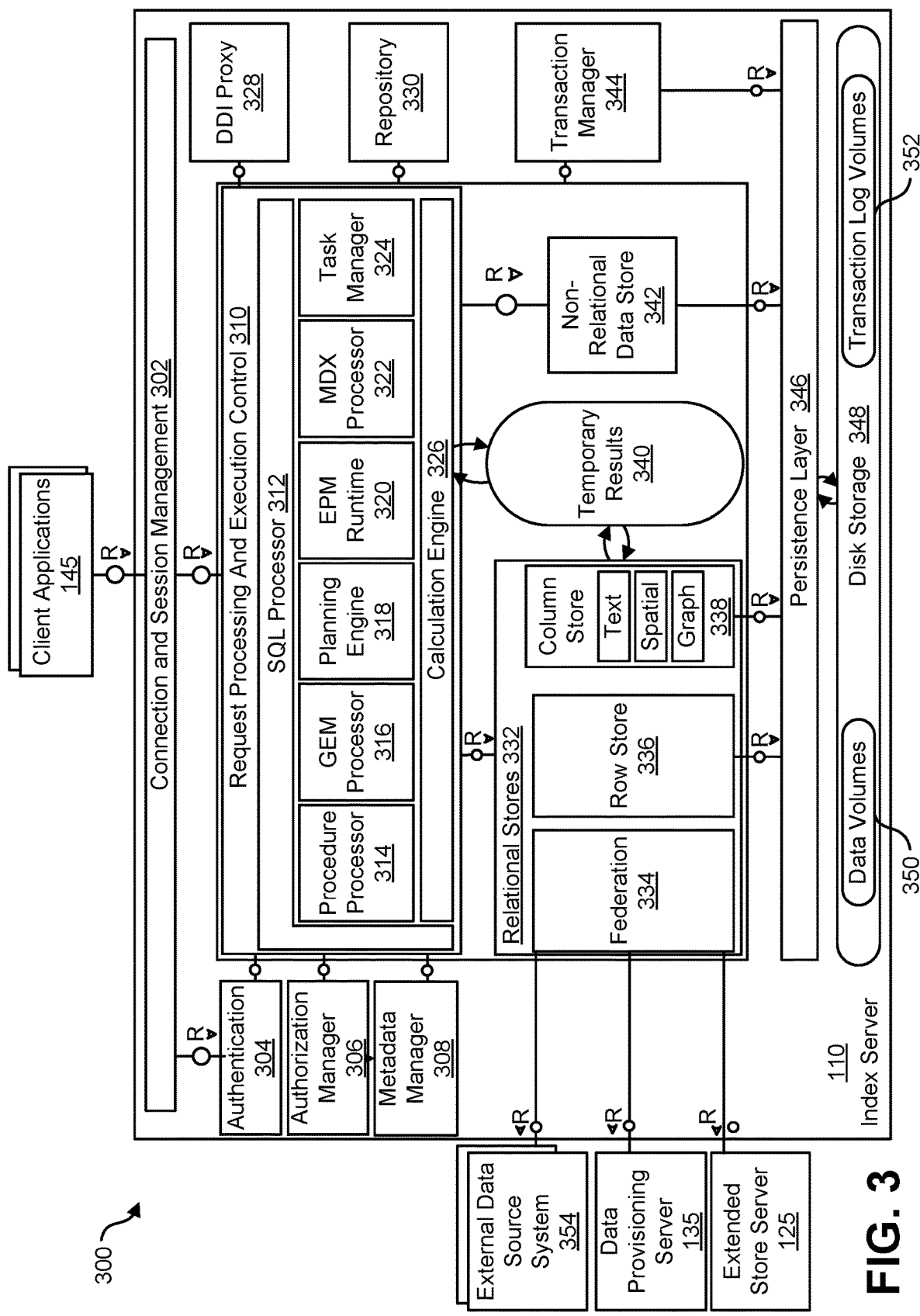
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can be forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 306. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 306 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph application program interface (API).

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and save points. The persistence layer 346 can provide interfaces for writing and reading persisted data and it can also contain a logger component that manages a recovery log. Recovery log entries can be written in the persistence layer 348 (e.g., in recovery log volumes 352) explicitly by using a log interface or implicitly when using the virtual file abstraction. The recovery log volumes 352 can include redo logs which specify database operations to be replayed whereas data volume 350 can contain undo logs which specify database operations to be undone as well as cleanup logs of committed operations which can be executed by a garbage collection process to reorganize the data area (e.g., free up space occupied by deleted data, etc.).

The persistence layer 346 stores data in persistent disk storage 348 which, in turn, can include data volumes 350 and/or transaction log volumes 352 that can be organized in pages. Different page sizes can be supported, for example, between 4 k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
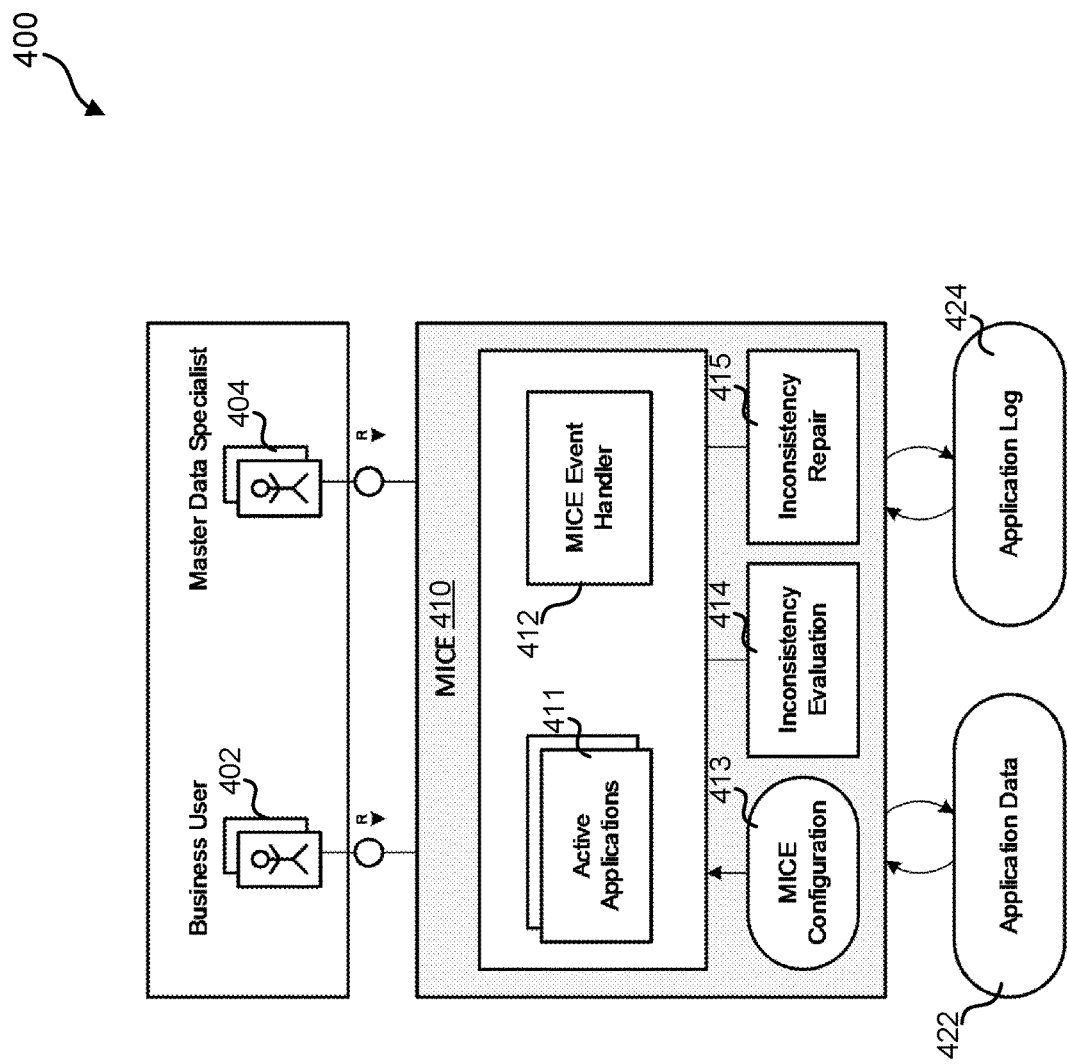
FIG. 4 is a block diagram depicting an example MICE framework design.

FIG. 4 is a block diagram 400 depicting an example MICE framework design. The MICE tool 410 is a central repository tool that can address master data inconsistencies (e.g., data mismatch between one or more database tables for a specific data identifier, database table pointer to data that does not exist). Master data can be core data in which transactions, such as business transactions, are built using. The MICE tool 410 can be a generic flexible framework that can be consumed by various master data applications (e.g., active applications 411). One or more users such as a business user 402 and/or a master data specialist 404 can interact with the MICE tool 410. The MICE tool 410 can include one or more active applications 411, a MICE event handler 412, a MICE configuration settings 413, inconsistency evaluation capabilities 414, and inconsistency repair capabilities 415. The MICE event handler is a decision maker that triggers the evaluate and/or repair functionalities of the inconsistency evaluation capabilities 414 and the inconsistency repair capabilities 415. Example MICE configuration settings 413 can include (i) registration application of specific classes, (ii) certain selection parameters, and/or (iii) database tables to be checked.

The MICE tool 410 can interface with application data 422 through the active applications 411 registered and one or more application logs 424. In one example, a company may try to deliver goods to a business partner (e.g., customer). In order to deliver the goods, the company uses data such as an address and phone number associated with the business partner (e.g., master data). If the address and phone number are inconsistent (e.g., incorrect address and/or phone number that is not associated with the business partner), then the goods may not be delivered properly and/or the transaction may not be processed. In some cases, the address and/or phone number may be in an incorrect format such as a U.S. phone number that is not ten digits and/or an address without critical information such as one or more of a street address, city, state, and/or zip code. If the information for the phone number and/or address are incorrect, the user may receive an error that defines that "address incomplete" or "phone number invalid." These errors can be automatically avoided utilizing the MICE tool 410.

Considering another example, a phone number can be associated with a business partner. The phone number (e.g., application data 422) can be stored in a number of database tables (e.g., 5-6 database tables) that are interconnected within a data model for a business. The interconnections between the database tables are references. An active application 411 requests a phone number. The inconsistency evaluation capabilities 414 evaluates the phone number and database table references across the database tables storing the phone number. If the phone number is inconsistent across the database tables, such as in an incorrect format and/or is the incorrect phone number for the particular business partner, the inconsistency repair capabilities 415 can repair incorrect phone number within the respective database table from one of the database tables. An application log 424 are written that (i) identify the data inconsistency (e.g., incorrect phone number in one or more database tables), (ii) identify a system and/or individual that repaired the data inconsistency, and (iii) how the data inconsistency was repaired.

In some variations, an application 411 can be registered as a "dependent application." If the application 411 is registered as a "dependent application" one or more unique checks can be performed for that application 411. For example, when evaluating a phone number, one or more fields within one or more additional database tables can also be evaluated for consistency. The results of the one or more unique checks can be displayed in addition to the consistency check.

The inconsistency repair capabilities 415 can provide the capability to repair, either automatically or manually, any identified inconsistencies from the inconsistency evaluation capabilities 414. For example, in some cases, an inconsistency may be repaired using one solution (e.g., correcting a format of a phone number to include dashes). In this case, the MICE tool 410 can automatically repair the inconsistency.

In other cases, an inconsistency may have multiple options for repair. For example, there may be two database tables containing inconsistent data: Table 1 and Table 2. In other words, the data within one database table for a particular data identifier (e.g., address, phone number, name) does not match the data for that same data identifier in another database table. The data inconsistency can be repaired either (i) in Table 1 based on the data within Table 2 by overwriting the data in Table 1 with that of Table 2 or (i) in Table 2 based on the data within Table 1 by overwriting the data in Table 2 with that of Table 1. Both of these repair options can be presented to the business user 402 through a graphical user interface using one or more prompts. In this example, the business user 402 can select which repair to make (e.g., overwriting the data in Table 1 or Table 2) and the MICE tool 410 can make such a repair to the data within the database table based on the repair selection made by the business user 402.

In another example, a hanging reference inconsistency can occur when the master data points to a transaction and that transaction does not exist. A transaction may not exist, for example, if it was deleted or archived. The MICE tool 410 can prompt a business user 402 to repair the data inconsistency by deleting the data from the database table. The MICE tool 410 can then either delete the data as proposed or keep the data based on the response from the business user 402 through the prompt displayed on a graphical user interface.

Figure 5:
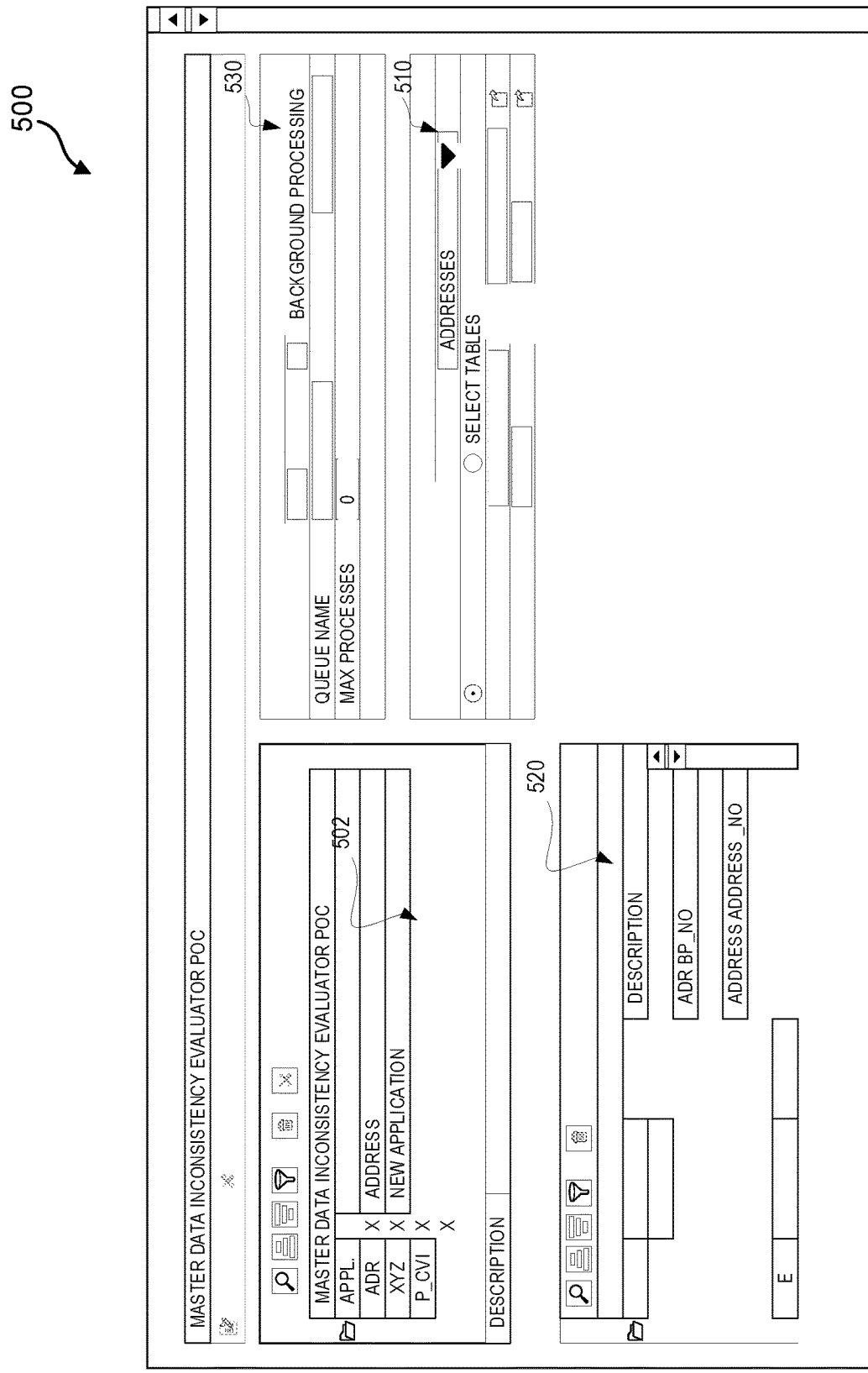
FIG. 5 is an example graphical user interface illustrating a primary selection screen of MICE.

FIG. 5 is an example graphical user interface illustrating a primary selection screen 500 of the MICE tool 410. The active applications 411 can enable themselves by going through a registration process. For example, active applications 502 (e.g., ADR, XYZ, P_CVI, ABC) are registered within the MICE tool 410. With such enablement, the MICE tool 410 can assist the user in identifying and/or repairing the inconsistencies within the master data relevant to the active applications 411. Using the primary selection screen 500 of the MICE tool 410, (i) selection parameters can be selected using application screen 510 as described in more detail in FIGS. 6-7, (ii) a run history can be analyzed using the MICE run history screen 520 as described in more detail in FIG. 8, and/or (iii) control parameters can be selected using the control parameters screen 530 as described in more detail in FIG. 9.

Figure 6:
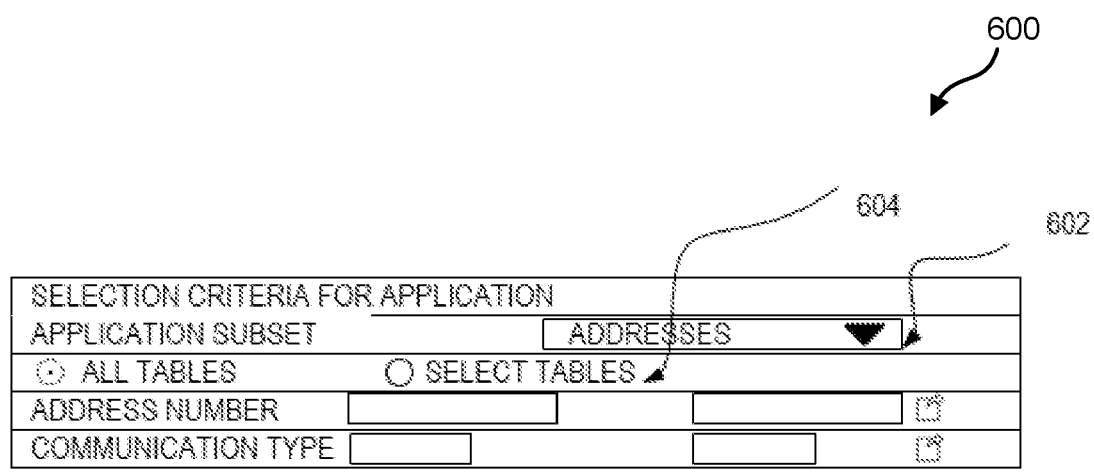
FIG. 6 is example graphical user interface illustrating an application selection screen.

FIG. 6 is example graphical user interface illustrating an application selection screen 600 (e.g., application screen 510 of FIG. 5). The presentation layer in general is offered by the MICE framework (e.g., the MICE tool 410). The framework offers the configuration to define the selection criteria (e.g., selection parameters). The active applications 411 can specify the selection parameters based on which the data is selected for inconsistency evaluation and/or repair. For example, selection parameters including (i) a data identifier 602 and (ii) one or more database tables selections 604 for consistency checking can be selected using the application screen 600. In some variations, the data identifier 602 can be a drop-down menu listing a number of selection parameters such as "Addresses," "Name," "Phone Number," and the like. These data identifiers 602 can be associated with the master data associated with one or more business partners. Further selection of which tables (e.g., database table selections 604) to evaluate can be made using the application selection screen 600. For example, a selection can be made to evaluate "All Tables" or "Specific Tables." When "All Tables" are selected, the inconsistency evaluation capabilities 414 evaluates the data identifiers 602 across all tables associated with the active applications 411. Alternatively, if "Specific Tables" are selected, the application selection screen 600 can expand to the extended application selection screen 700 as illustrated and described in FIG. 7.

Figure 7:
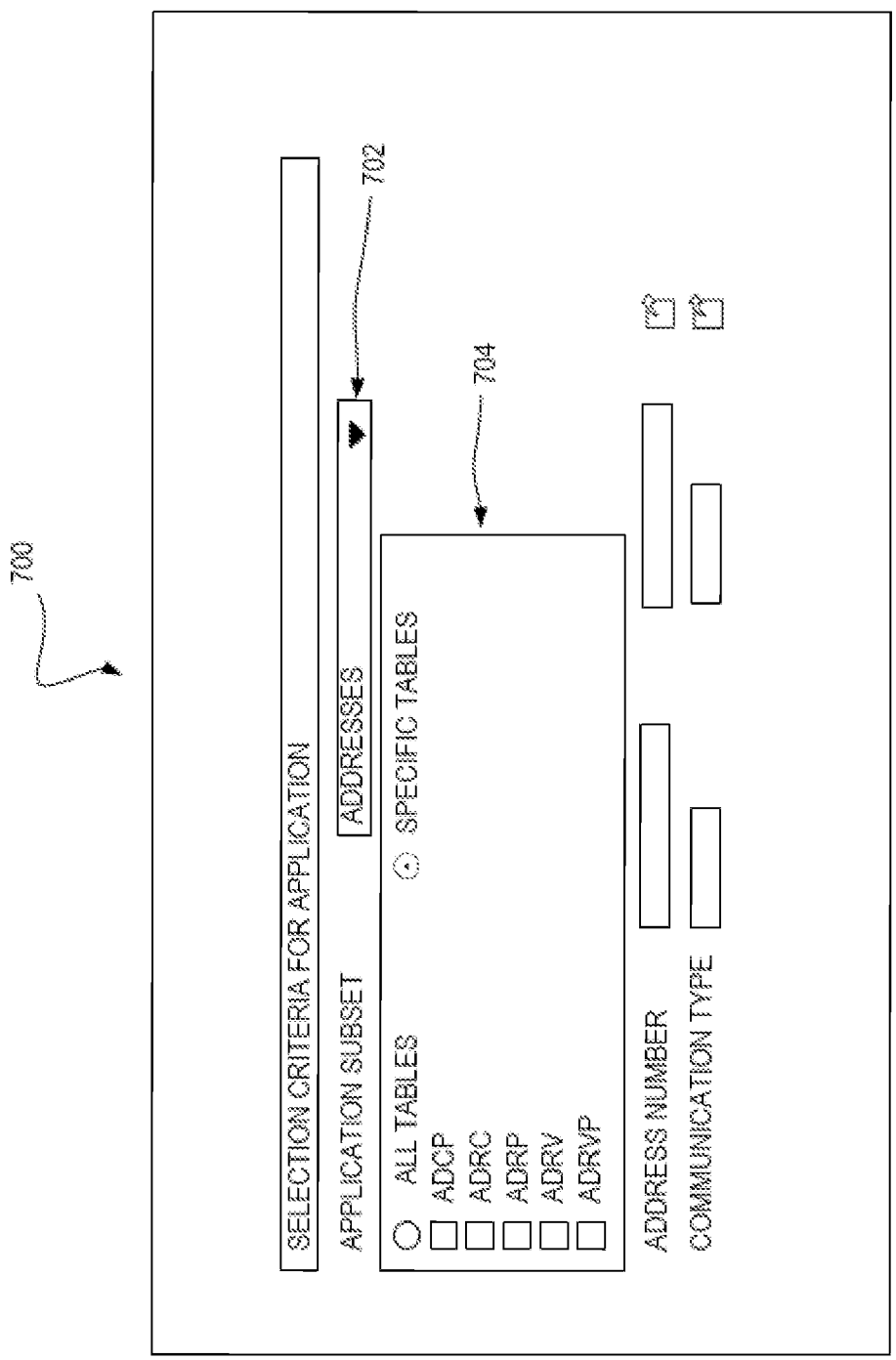
FIG. 7 is an example graphical user interface illustrating an extended application selection screen from the selection screen of FIG. 6.

Based on the configuration set by the active applications 411, the framework displays the selection parameters for each of the active applications 411. For example, FIG. 7 is an example graphical user interface illustrating an extended application selection screen 700 from the primary selection screen 600 of FIG. 6. Using the configuration capabilities offered by the MICE tool 410, such as through the extended application selection screen 700, the active applications 411 can specify at multiple levels as to what are the selection parameters.

Using the extended application selection screen 700, a selection can be made to evaluate "Specific Tables," with those specific tables further identified (e.g., ADCP, ADRC, ADRP, ADRV, ADRVP, etc.). Data identifiers 702 and/or table selections 704 can be further modified using the extended application selection screen 700 to narrow the particular selection to a particular range (e.g., address number) or communication type. Considering the previous example of a phone number, the communication type can be, for example, an email address, URI, and/or phone number.

One can appreciate that although the data identifiers 702 and table selections 704 are illustrated as a drop-down menu and selection check boxes, respectively, any type of selection tool can be used to identify such parameters including, but not limited to, drop-down menus, selection check boxes, radio buttons, manual text box entries, and the like.

In an evaluation phase of MICE, the framework calls the application specific logic that is registered under the interface for evaluation (e.g., EVAL). The primary task of these modules is to read the data from the database tables and perform the data model inconsistency evaluation. The results can be displayed in an ALV grid. The errors can be presented to the user in an understandable format. The results can also be stored under an application log 424 if user chooses to do so.

In a repair phase of MICE, the framework calls the application specific logic that is registered under the interface for repair (e.g., REPAIR). This application logic can correct the data model inconsistencies by either creating/ adjusting/deleting the respective data depending on the nature of inconsistency or by providing necessary steps to correct the data model inconsistencies.

From the evaluated result list, it can be possible to either select individual inconsistencies and repair or repair all the inconsistencies at once. In such cases, the tool can point to the possible guidelines which are provided by the respective active applications 411 that can be followed accordingly so that the errors in the business processes can be avoided.

If the user running the MICE tool desires to save the results of the evaluation/repair runs, then this can be stored in the application logging framework. The logs can then be accessed using the application log transactions SLG1, SLG2 and SLGD.

Figure 8:
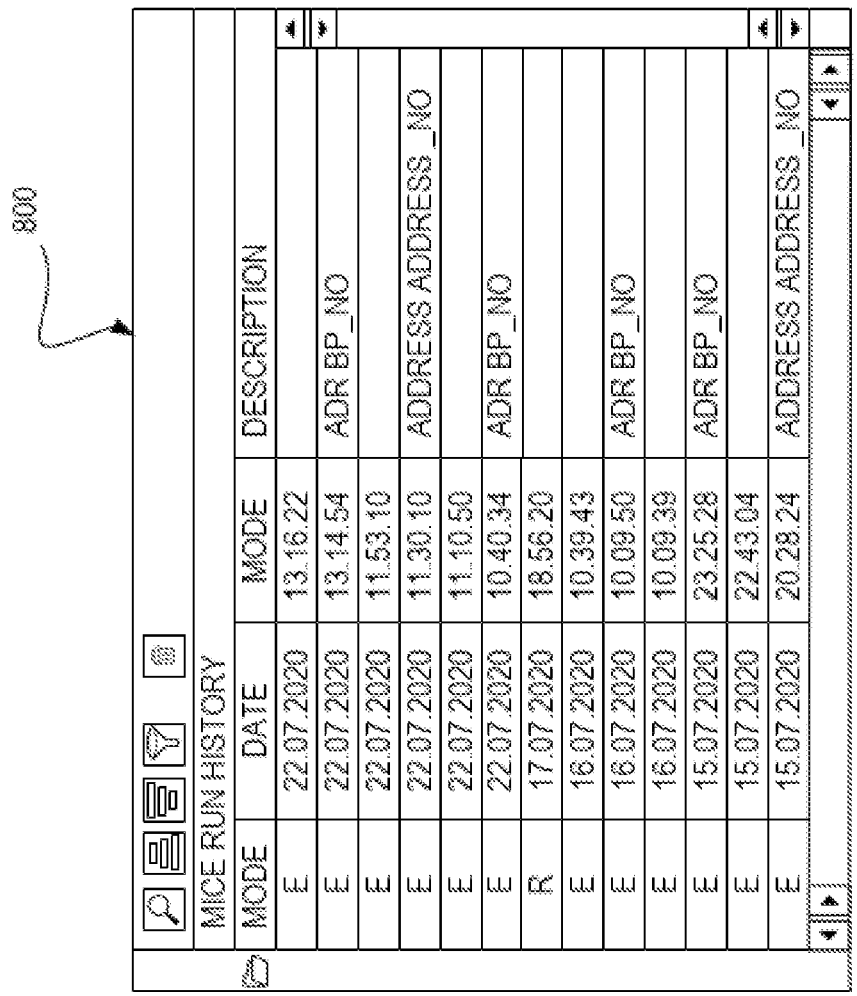
FIG. 8 is a graphical user interface illustrating MICE run history.

FIG. 8 is a graphical user interface 800 illustrating MICE run history (e.g., MICE run history screen 520 of FIG. 5). The MICE tool has the capability to display the run history. Graphical user interface 800 displays the time of Evaluation/ Repair runs and the mode of operation. Use of the graphical user interface 800 also helps to navigate to the respective application log. User can view the results in the application log transactions as well as in the MICE tool's results screen.

Using the graphical user interface 800, entries within the run history can be reviewed and/or deleted. The delete option also can delete the respective record from the application log 424.

Within the graphical user interface 800, a user can specify whether the user wants to store the run history for that instance of run. Based on this the run history tables within the respective database can be updated.

Figure 9:
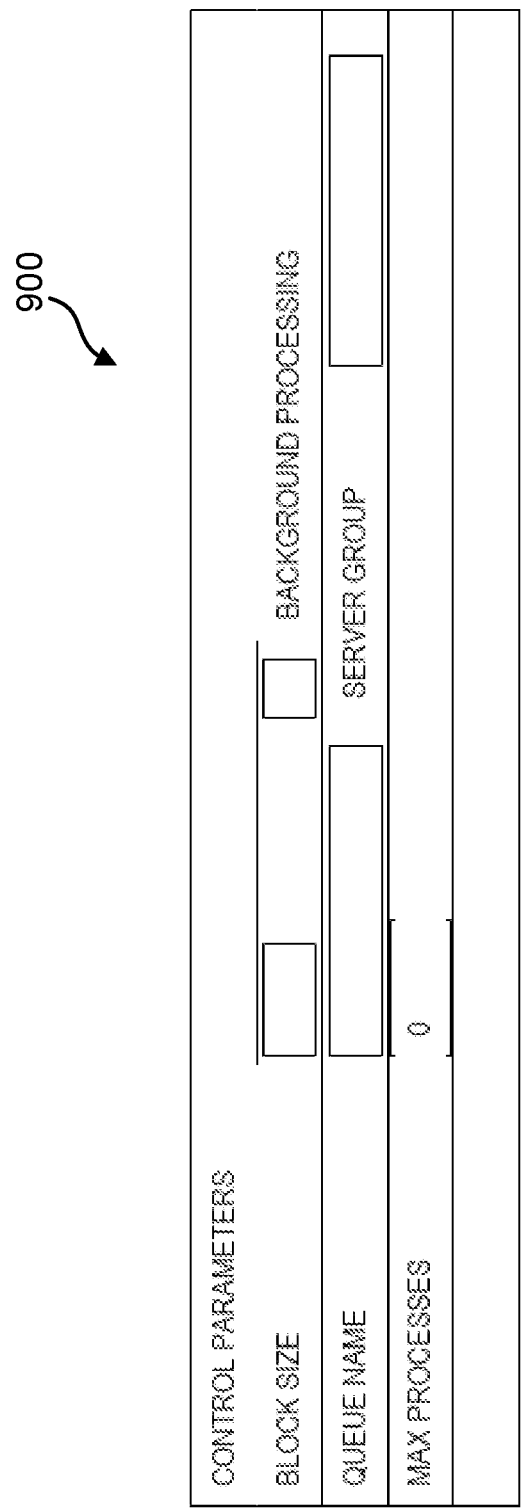
FIG. 9 is a graphical user interface illustrating control parameters for MICE.

FIG. 9 is a graphical user interface 900 illustrating control parameters for MICE (e.g., the control parameters screen 530 of FIG. 5). The MICE tool can support various control parameters as shown in FIG. 9. These parameters can facilitate performance aspects including, but not limited to, processing modes, block size, queue name, server groups, and/or maximum processes. Through setting the various control parameters, the inconsistency checks can be configured in such a way to enable parallel processing of the checks.

By setting the control parameters using the graphical user interface 900, the evaluate/repair operations can be configured to run either foreground mode or background mode. The default operation can be the foreground execution. However, upon setting the parameter 'Background processing', the tool can execute the selected operation in background mode. During background mode, the evaluation happens using parallel processes, eventually leading to faster data processing.

Within the MICE framework, the processing of data happens in data packages. With the use of block size, it is possible to define how many records shall be processed in each data package. This parameter can be helpful when there is huge data to be processed. It also helps to avoid memory dumps due to mass processing. The MICE tool can process the data sequentially in the selected block size. The default block size can be set to 100.

The queue name denotes the name of the background process in which the data packages of the evaluation process are listed. A user can choose any name for the background process. With the help of this queue name it can be possible to check the status of execution under transaction SMQ2. The queue name can be defaulted to MICE QUEUE, however the user can change it.

The server group selected in the MICE selection screen 900 can be the one used for parallel processing for background mode evaluation. Parallel processing enables the workload to be distributed to several application servers, thereby considerably reducing the runtime. When a server group is entered, the processing is carried out within one work process and not distributed to others.

The 'Max. Processes' field specifies the number of data blocks processed in parallel by the system during MICE data processing. This parameter is used in conjunction with background processing and the Queue Name field.

Figure 10:
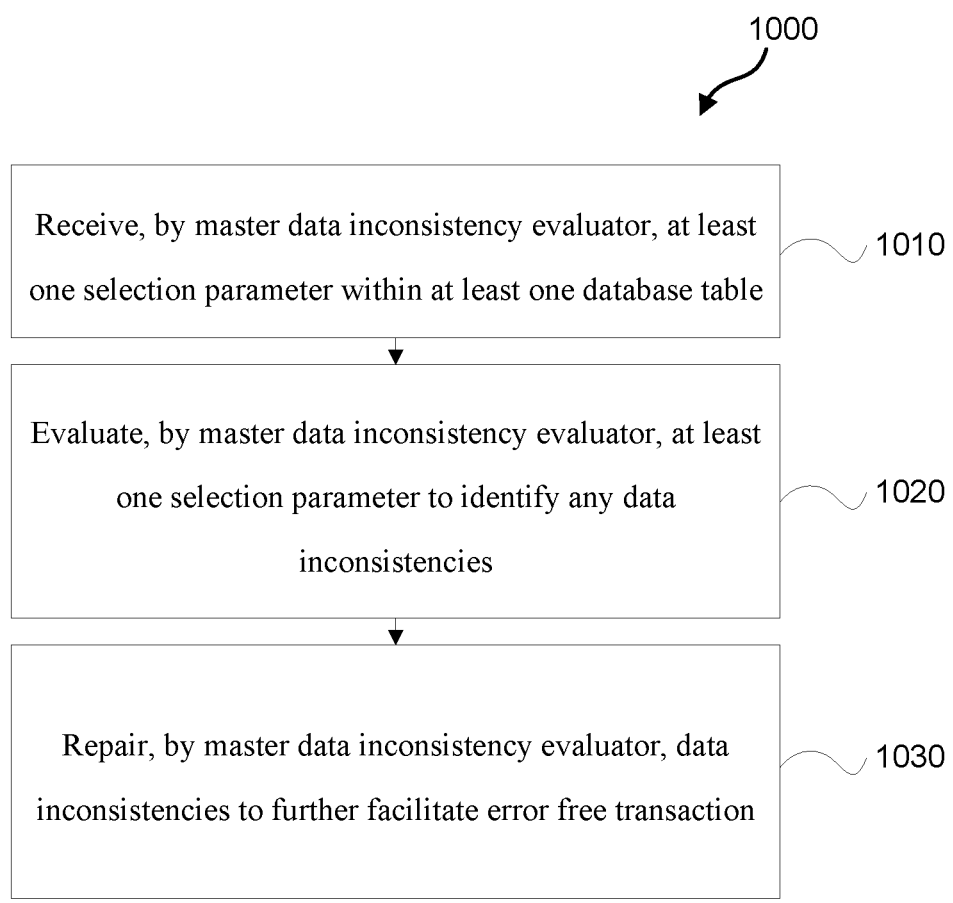
FIG. 10 is a flowchart illustrating a method for identifying and/or remedying data inconsistencies between one or more database tables.

FIG. 10 is a flowchart illustrating a method for identifying and/or remedying data inconsistencies between one or more database tables. The master data inconsistency evaluator receives, at 1010, at least one selection parameter that identifies a database. By the master data inconsistency evaluator, the selection of the at least one selection parameter is evaluated, at 1020, for data inconsistencies that cause an error in a transaction such as errors in business transactions. For example, the selection parameter (e.g., address) is compared against other corresponding selection parameters across the database tables which contain the selection parameter. For example, if the active application 411 is associated with two database tables that each contain a selection parameter of phone number. The data entry for phone number in each of these two database tables are compared against each other to confirm whether the data entry matches. If the data entry does not match, a data inconsistency is identified. The master data inconsistency evaluator repairs, at 1030, the data inconsistencies to further facilitate error free business transactions. Repair of inconsistencies can be based on individual application's choice of how the action is carried out.

Figure 11:
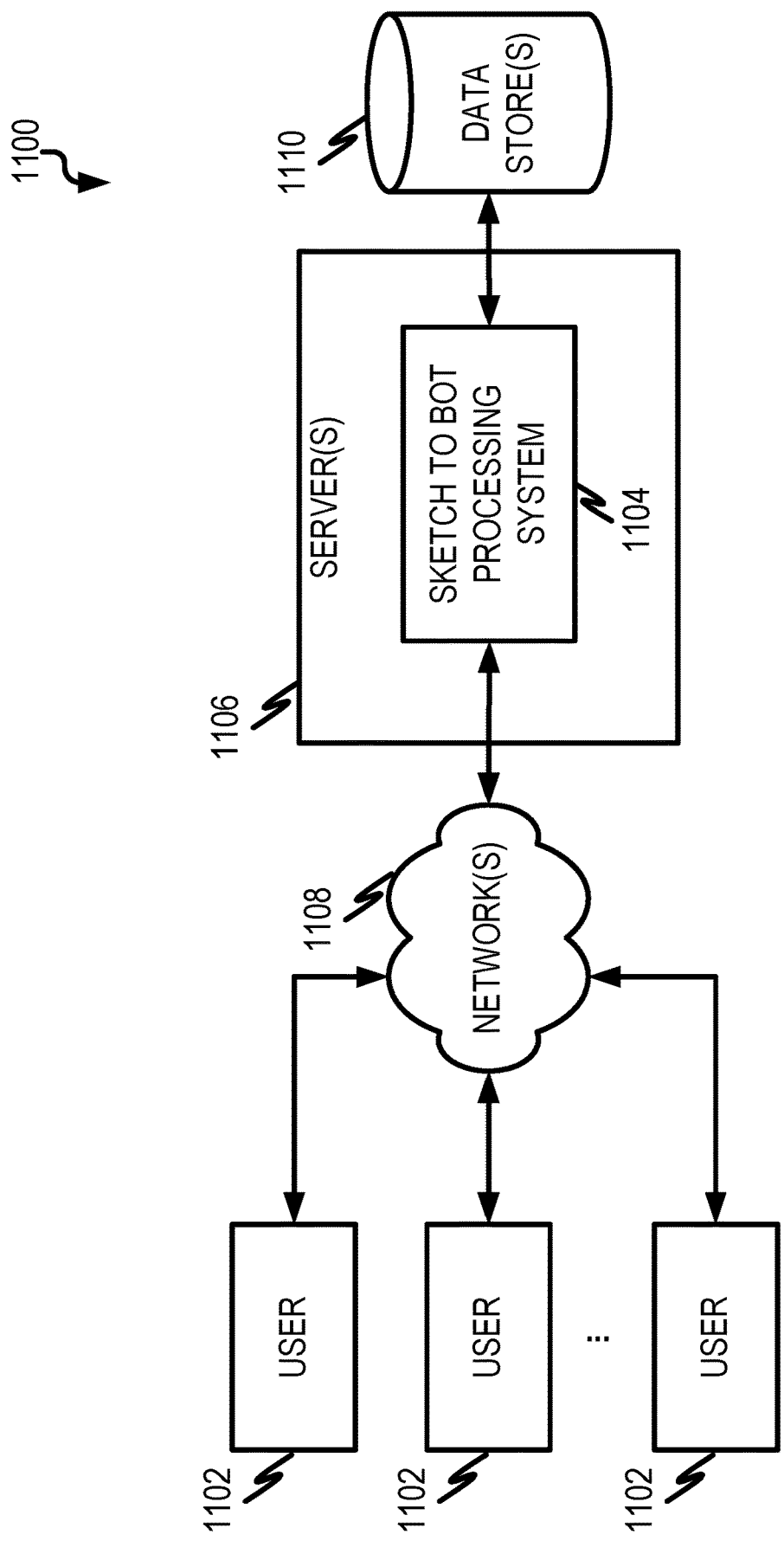
FIG. 11 illustrates an example computer-implemented environment for implementing various aspects described herein.

FIG. 11 illustrates an example computer-implemented environment 1100 wherein users 1102 can interact with MICE operating on a processing system 1104 for processing handwritten images as described herein, hosted on one or more servers 1106 through a network 1108. The processing system 1104 can assist the users 1102 with interfacing between an object-oriented modeling language based interface and a hardware description language based interface.

As shown in FIG. 11, the users 1102 can interact with the processing system 1104 through a number of ways, such as over one or more networks 1108. One or more servers 1006 accessible through the network(s) 1108 can host the processing system 1104. The one or more servers 1106 can also contain or have access to one or more data stores 1110 for storing data for the processing system 1104.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 12:
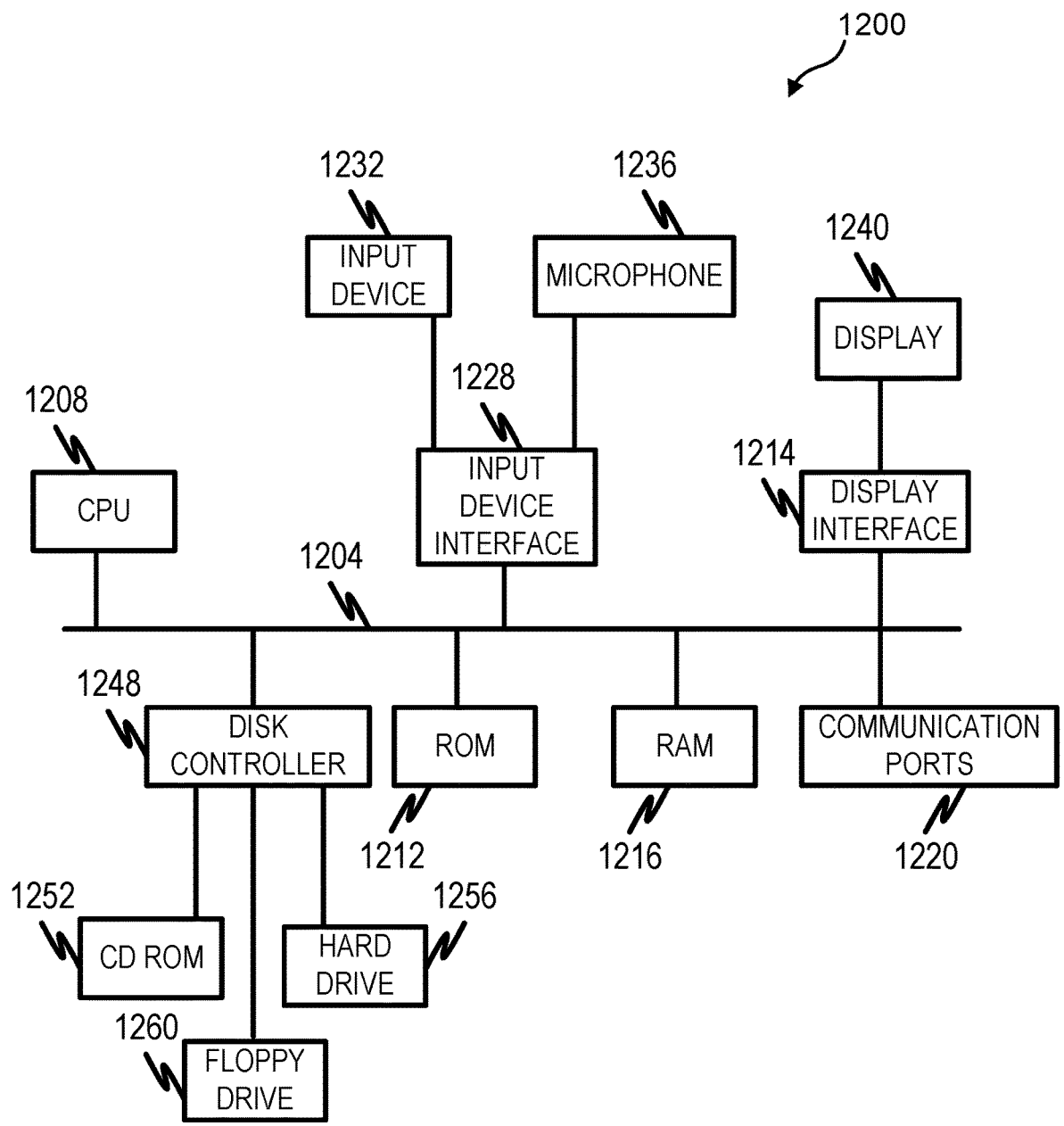
FIG. 12 is a diagram illustrating a sample computing device architecture for implementing various aspects described herein.

FIG. 12 is a diagram 1200 illustrating a sample computing device architecture for implementing various aspects described herein. A bus 1204 can serve as the information highway interconnecting the other illustrated components of the hardware. A processing system 1208 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1212 and random access memory (RAM) 1216, can be in communication with the processing system 1208 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1248 can interface one or more optional disk drives to the system bus 1204. These disk drives can be external or internal floppy disk drives such as 1260, external or internal CD-ROM, CD-R, CD-RW or DVD, or solid state drives such as 1252, or external or internal hard drives 1256. As indicated previously, these various disk drives 1252, 1256, 1260 and disk controllers are optional devices. The system bus 1204 can also include at least one communication port 1220 to allow for communication with external devices either physically connected to the computing system or available externally through a wired or wireless network. In some cases, the communication port 1220 includes or otherwise comprises a network interface.

To provide for interaction with a user, the subject matter described herein can be implemented on a computing device having a display device 1240 (e.g., a CRT (cathode ray tube) or LCD (liquid crystal display) monitor) for displaying information obtained from the bus 1204 to the user and an input device 1232 such as keyboard and/or a pointing device (e.g., a mouse or a trackball) and/or a touchscreen by which the user can provide input to the computer. Other kinds of input devices 1232 can be used to provide for interaction with a user as well; for example, feedback provided to the user can be any form of sensory feedback (e.g., visual feedback, auditory feedback by way of a microphone 1236, or tactile feedback); and input from the user can be received in any form, including acoustic, speech, or tactile input. In the input device 1232 and the microphone 1236 can be coupled to and convey information via the bus 1204 by way of an input device interface 1228. Other computing devices, such as dedicated servers, can omit one or more of the display 1240 and display interface 1214, the input device 1232, the microphone 1236, and input device interface 1228.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for identifying data inconsistencies within database tables associated with an application, the method comprising:

receiving, by a master data inconsistency evaluator, at least one selection parameter within at least one database table, the at least one selection parameter identifying a field within the at least one database table, the data further comprising control parameters, the control parameters defining constraints on evaluation of the at least one selection parameter;

evaluating, by the master data inconsistency evaluator, the at least one selection parameter by comparing the field in the at least one database table with a same field in other database tables associated with the application to identify data inconsistencies, the evaluating being constrained by the control parameters; and repairing, by the master data inconsistency evaluator, the data inconsistencies to further facilitate an error free transaction, the repairing including changing a value of the field in either the at least one database table or in one or more of the other database tables.

2. The method of claim 1, wherein the control parameters further comprise at least one of (i) a block size used for the evaluating, (ii) a queue name used during the evaluating, (iii) a server group used to perform the evaluating, or (iv) a maximum processes used during the evaluating.

3. The method of claim 2, wherein the block size defines a number of records for processing in each data package associated with the evaluating.

4. The method of claim 2, wherein the queue name defines a name of a background process in which data packages associated with the evaluating.

5. The method of claim 2, wherein the server group is used for parallel processing of a background evaluation mode.

6. The method of claim 2, wherein the maximum processes define a number of data blocks processed in parallel during the evaluating.

7. The method of claim 1, wherein the database tables are stored within an in-memory database.

8. A system for identifying data inconsistencies within database tables associated with an application, the system comprising:

one or more data processors; and memory storing instructions stored on one or more data processors, which when executed perform operations comprising:

receiving, by a master data inconsistency evaluator, at least one selection parameter within at least one database table, the at least one selection parameter identifying a field within the at least one database table, the data further comprising control parameters, the control parameters defining constraints on evaluation of the at least one selection parameter;

evaluating, by the master data inconsistency evaluator, the at least one selection parameter by comparing the field in the at least one database table with a same field in other database tables associated with the application to identify data inconsistencies, the evaluating being constrained by the control parameters; and repairing, by the master data inconsistency evaluator, the data inconsistencies to further facilitate an error free transaction, the repairing including changing a value of the field in either the at least one database table or in one or more of the other database tables.

9. The system of claim 8, wherein the control parameters further comprise at least one of (i) a block size used for the evaluating, (ii) a queue name used during the evaluating, (iii) a server group used to perform the evaluating, or (iv) a maximum processes used during the evaluating.

10. The system of claim 9, wherein the block size defines a number of records for processing in each data package associated with the evaluating.

11. The system of claim 9, wherein the queue name defines a name of a background process in which data packages associated with the evaluating.

12. The system of claim 9, wherein the server group is used for parallel processing of a background evaluation mode.

13. The system of claim 9, wherein the maximum processes define a number of data blocks processed in parallel during the evaluating.

14. The system of claim 8, wherein the database tables are stored within an in-memory database.

15. A non-transitory computer program product storing instructions which, when executed by at least one data processor forming part of at least one computing device, implement operations for identifying data inconsistencies within database tables associated with an application, the operations comprising:

receiving, by a master data inconsistency evaluator, at least one selection parameter within at least one database table, the at least one selection parameter identifying a field within the at least one database table, the data further comprising control parameters, the control parameters defining constraints on evaluation of the at least one selection parameter;

evaluating, by the master data inconsistency evaluator, the at least one selection parameter by comparing the field in the at least one database table with a same field in other database tables associated with the application to identify data inconsistencies, the evaluating being constrained by the control parameters; and repairing, by the master data inconsistency evaluator, the data inconsistencies to further facilitate an error free transaction, the repairing including changing a value of the field in either the at least one database table or in one or more of the other database tables.

16. The non-transitory computer program product of claim 15, wherein the control parameters further comprise at least one of (i) a block size used for the evaluating, (ii) a queue name used during the evaluating, (iii) a server group used to perform the evaluating, or (iv) a maximum processes used during the evaluating.

17. The non-transitory computer program product of claim 16, wherein the block size defines a number of records for processing in each data package associated with the evaluating.

18. The non-transitory computer program product of claim 16, wherein the queue name defines a name of a background process in which data packages associated with the evaluating.

19. The non-transitory computer program product of claim 16, wherein the server group is used for parallel processing of a background evaluation mode.

20. The non-transitory computer program product of claim 16, wherein the maximum processes define a number of data blocks processed in parallel during the evaluating.

* * * * *